Sept. 20, 1938.     E. C. MORPHET     2,130,892
AUTOMATIC BRAKE LATCH
Filed Nov. 15, 1935     2 Sheets-Sheet 1
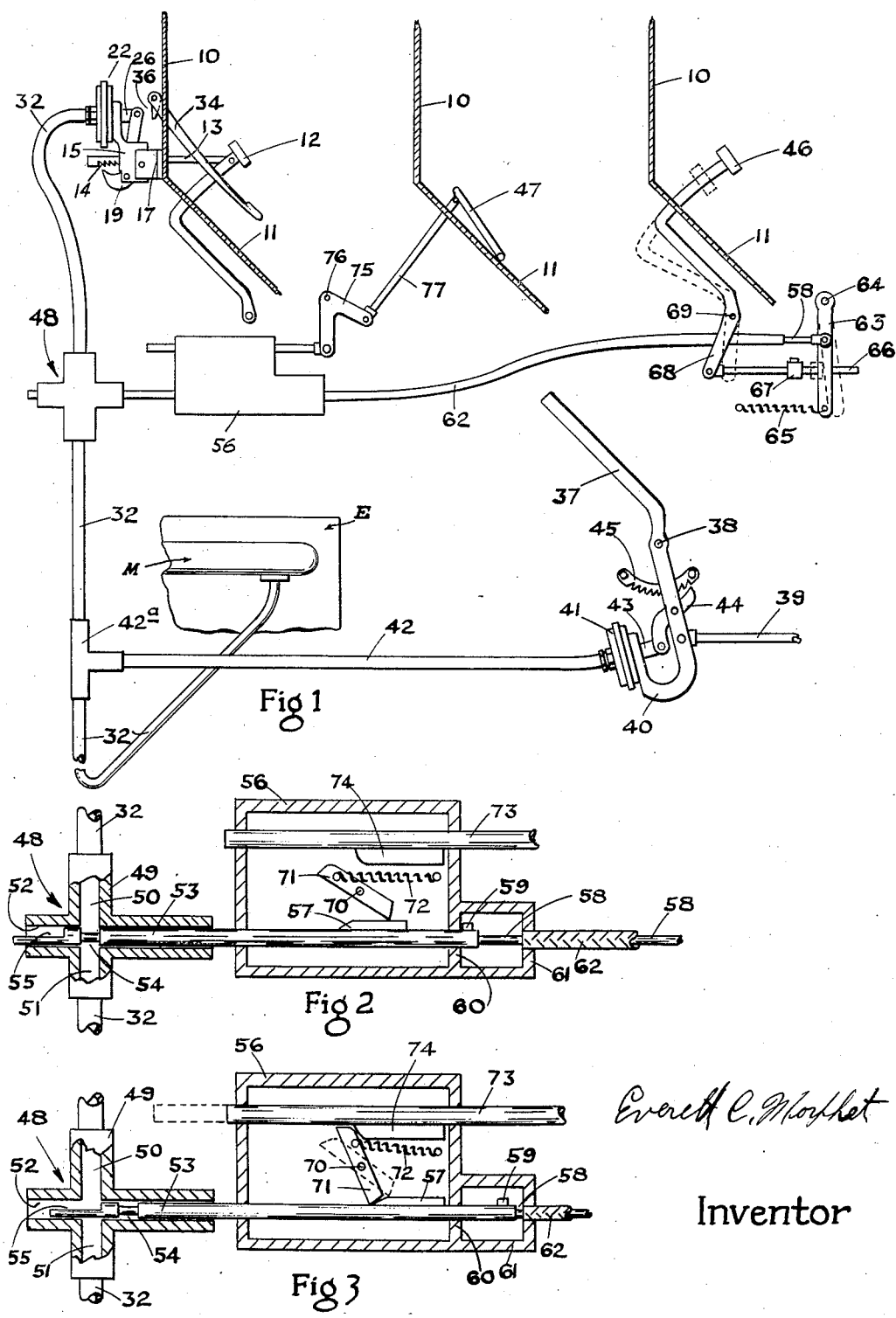
Everett C. Morphet
Inventor

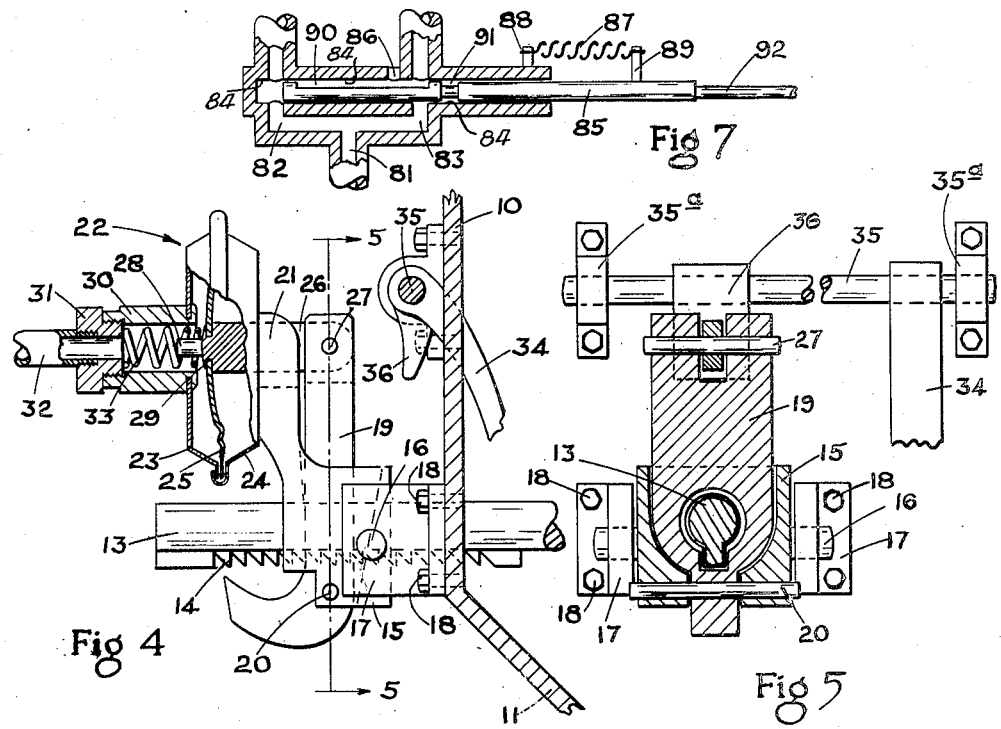
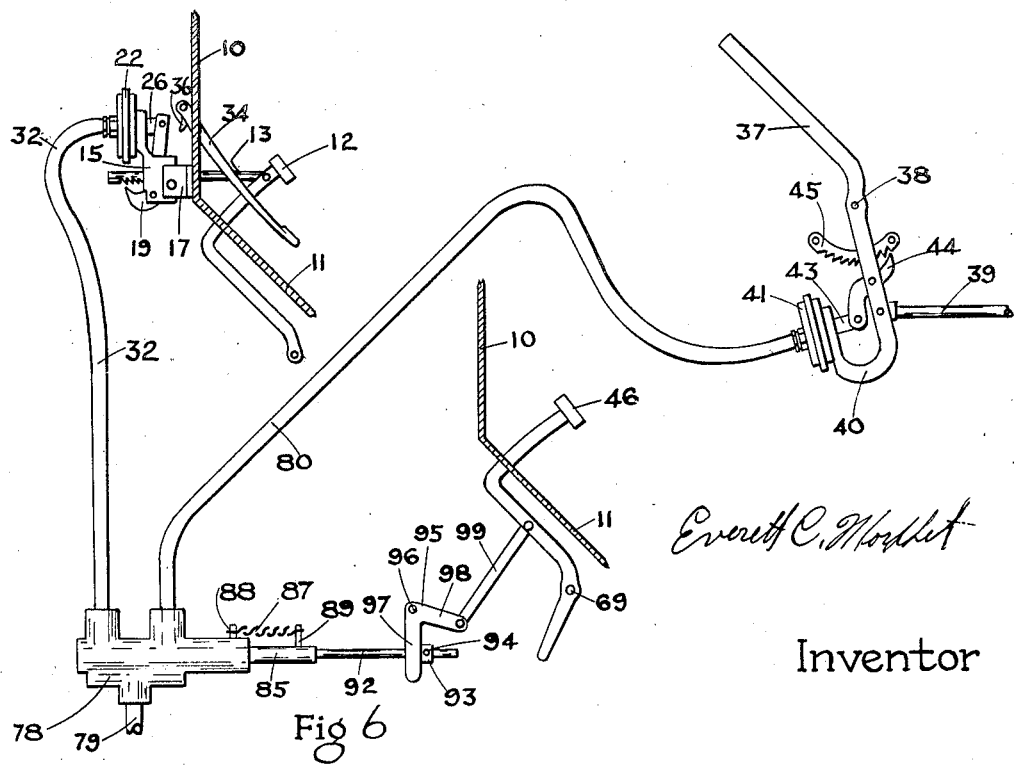

Patented Sept. 20, 1938

2,130,892

UNITED STATES PATENT OFFICE 2,130,892

AUTOMATIC BRAKE LATCH

Everett C. Morphet, Wilmar, Calif., assignor to Bendix Products Corporation, South Bend, Ind., a corporation of Indiana Application November 15, 1935, Serial No. 49,938

5 Claims. (Cl. 192—.01)

My invention relates to brakes for vehicles, particularly automobiles, and is directed to automatic means for releasably holding the brake mechanism of an automobile in brake-applying positions.

The general object of my invention is to provide a brake-latch that will be responsive to the power plant of a vehicle, or to the power plant and associated controls, thereby providing various automatic functions making for convenience and safety in driving.

One specific object of my invention is to provide a latch whereby the normally free foot brake used in driving may be latched in an effective position for parking.

Another object of my invention is to provide means whereby a brake latched in an effective position for parking will be automatically released as soon as the motor is started. In other words, I propose to relieve the driver of responsibility for releasing a brake applied for parking.

A further object of my invention is to provide an automatic latch for holding the foot brake applied in traffic. In other words, one of my purposes is to provide an automatic brake-latch for holding the foot brake in an effective position without effort on the part of the driver during a temporary stop, in traffic or on a hill with the motor running.

Another object of my invention is to provide a brake-latch that will automatically engage a brake mechanism when the automobile stalls on a hill and will automatically become disengaged when driving is resumed.

Another object is to provide means for automatically releasing a brake-latch as soon as, or immediately before driving power is applied, or as soon as, or immediately before the motor is accelerated for such application of power.

Broadly described, my invention comprises a brake-latch responsive to the motor or to the motor together with the clutch, or together with the clutch and throttle.

These and other objects, features, and advantages will be apparent in the following description taken with the accompanying drawings, in which:

Fig. 1 is a schematic arrangement of my invention, the various parts being shown in elevation;

Fig. 2 is an enlarged view in section showing the valve and valve-latch used in my invention;

Fig. 3 is a similar view with parts in different disposition;

Fig. 4 is an enlarged elevation partly in section of the brake-latch proper;

Fig. 5 is a vertical section taken on the line 5—5 of Fig. 4;

Fig. 6 is a schematic portrayal of a modification of the arrangement shown in Fig. 1; and Fig. 7 is an enlarged section of the valve shown in Fig. 6.

My invention comprises preferably a combination such as indicated by Fig. 1. But such a combination incorporates a subcombination that may be used alone as the simplest form of my invention, this subcombination comprising a brake-latch associated with the motor to become effective automatically when the motor is idle and to become ineffective automatically when the motor is energized.

Fig. 1 shows the dash 10 of the automobile and the floor 11, thru which extends the usual pedal or foot-brake 12 for applying the brakes (not shown) during driving. Pivotally connected to the pedal is a latch-bar 13 that extends forward thru the dash, the latch-bar having suitable teeth 14 depending from its lower side.

A latch frame 15 is pivotally mounted by trunnions 16 to a pair of suitable brackets 17, that are, in turn, mounted to the front face of the dash by bolts 18. This rocking frame is vertically apertured to receive a suitable hook-shaped latch or pawl 19 that extends thru the frame and is pivotally mounted thereto by a pin 20. Both latch frame 15 and pawl 19 are suitably apertured horizontally to slidingly receive the forward end of latch-bar 13, the latch bar being free for longitudinal movement except when the pawl is rotated into engagement with teeth 14 to prevent rearward movement of the bar. Obviously, frame 15 will rock to accommodate any position of latch-bar 13. I contemplate causing the pawl to be urged by a yielding means towards engagement with teeth 14, and using some suitably controlled power-actuated means to move and hold the pawl out of such engagement. In the particular construction chosen to illustrate the principles of my invention, I use a vacuum-actuated device deriving power from the intake manifold of the engine, it being understood that other actuating devices are within the scope of my conception.

Fig. 4 shows an upwardly extending arm 21 of frame 15 to which is suitably mounted a vacuum-control cylinder, generally designated by numeral 22, of a type well known to the art. This cylinder includes a forward vacuum chamber 23 and a rearward atmospheric chamber 24 separated by a suitable diaphragm 25.

A plunger 26 pivotally connected at its rear end to the upper end of pawl 19 by pin 27 is connected to diaphragm 25, the forward reduced end 28 of the plunger extending thru the diaphragm and being secured thereto by a suitable keeper 29.

A cylindrical member 30 extending forward from the body of vacuum cylinder 22, is threaded to receive a suitable bushing 31 by means of which a pipe or vacuum tube 32 from the intake manifold M of engine E is connected with vacuum chamber 23. The aforesaid yielding means is a helical spring 33 in cylindrical member 30 compressed between bushing 31 and keeper 29, the spring surrounding reduced end 28 of the plunger.

The parts described are so related that spring 33 will tend to move pawl 19 into engagement with latch teeth 14, and diaphragm 25 will move the latch out of such engagement when air is sufficiently exhausted from vacuum chamber 23 by the motor intake.

Since it may be desirable to release the latch in the absence of such a vacuum, my mechanism may include a manual release comprising an auxiliary pedal 34 that extends thru the dash and is keyed to a shaft 35 journaled in a suitable pair of brackets 35a. Also keyed to shaft 35 is a finger or rocker arm 36 positioned to move pawl 19 out of engagement with teeth 14 when pedal 34 is depressed.

The parts described to this point embody the aforementioned subcombination that may be used alone as a mechanism of utility. For example, by virtue of such an automatic brake-latch, the foot brake may be employed to secure the car during parking. Because such a latch releases automatically as soon as the motor is started, the operator is relieved of the responsibility of remembering to release the brake. Such an arrangement not only simplifies driving, but also saves wear on the brakes.

This subcombination may also be used with the usual emergency or parking brake lever, such an arrangement being indicated in the lower part of Fig. 1. Brake lever 37 pivoted at 38 is connected to the brakes by rod 39. On an arm 40 extending from the lower end of the lever is mounted a vacuum-control cylinder 41 connected with the motor intake by a pipe 42 extending from a T 42a in pipe 32. Vacuum control cylinder 41 has a plunger 43 operatively connected with a pawl 44 that is mounted on brake lever 37 to engage an associated fixed rack 45.

The operation of this second embodiment of my subcombination will be apparent from the previous description. When the motor is stopped the concealed spring in the vacuum control will cause pawl 44 to engage rack 45 when the driver applies the emergency brake for parking. When the motor is subsequently started for driving, the vacuum control cylinder will release the pawl from the rack.

In the preferred form of my invention the brake latch is not only responsive to the motor but is also responsive to one or more of the motor controls. For example, in the arrangement shown in Fig. 1, the latch associated with the foot pedal may respond to movement of the clutch pedal 46 and also may respond to movement of the foot throttle or accelerator pedal 47.

To establish the desired relationships, a valve, generally designated by numeral 48 is inserted in pipe 32 between the motor intake and vacuum control cylinder 22. This is preferably a three-way valve that in one position connects vacuum-control cylinder 22 with the motor intake and in an alternate position cuts off the motor intake and admits atmospheric pressure to the vacuum-control cylinder.

In the form of valve shown, valve body 49 (see Figs. 2 and 3) is bored to provide a passage 50 communicating with vacuum-control cylinder 22 and a co-axial passage 51 communicating with the motor intake.

A cross bore 52, open at both ends, slidingly houses a cylindrical valve member 53. At the normal position of this valve, an annular recess 54 in the valve member registers with passages 50 and 51 to permit communication thru the valve from the motor intake to vacuum-control cylinder 22; in the alternate or second position of the valve, the body of valve member 53 cuts off passage 51 to the motor intake while an end recess 55 in the valve member registers with passage 50 to permit air from the atmosphere to flow thru pipe 32 to vacuum-control cylinder 22, as shown in Fig. 3.

Valve member 53 slidingly extends from valve body 49 and thru a control box 56, the valve member having an integral lug 57 housed by the box. The end of the valve member is bored to receive the end of a cable 58, the cable being secured by a set screw 59 that also cooperates with wall 60 as a stop to limit movement of the valve member in one direction. A suitable yoke 61 integral with wall 60 retains the end of a sheath or cable cover 62 for cable 58.

Cable 58 is connected at its other end to a suitable rocker-arm 63 pivoted at 64. The free end of the rocker-arm is pulled by a suitable spring 65 in a direction to move valve member 53 to the normal valve position shown in Fig. 2 establishing communication thru the valve from the motor intake.

Rocker arm 63 is suitably apertured to slidingly receive a rod 66 having an adjustable collar or stop 67 positioned to act upon the rocker-arm. This slide rod is pivotally connected to the lower arm 68 of the aforementioned clutch pedal 46, the pedal being pivoted at 69.

The parts listed are so related that when the clutch pedal is depressed thereby moving collar 67 against rocker-arm 63, valve member 53 will be shifted to the second position of the valve indicated by Fig. 3.

Pivoted on a pin 70 in control box 56 is a suitable latch lever 71 adapted to engage lug 57 of valve member 53 when the valve is in the second position, such engagement being encouraged by a suitable latch spring 72. This latch lever, when engaged, will keep spring 65 from returning the valve member to its normal position.

Slidably extending thru control box 56 is a release rod 73 having an integral lug 74 positioned to move against the upper end of latch lever 71 to force the latch lever out of engagement with valve lug 57, the releasing action being clear from the dotted lines in Fig. 3. Release rod 73 is connected to one arm of a bell crank 75, that is pivoted at 76, the other arm of the bell crank being connected by a rod 77 to the aforementioned throttle or accelerator pedal 47, so that depression of the pedal causes latch lever 71 to release the valve member.

In the arrangement shown in Fig. 1, the brake-latch associated with the emergency brake lever 37 will be controlled directly by the motor intake at all times, the functioning of the latch being as herebefore described. The action of the brake-latch associated with the foot brake, however, will depend not only upon whether or not motor of the automobile is running, but also upon the position of valve member 53.

Under normal driving conditions with the motor running and the clutch engaged, pawl 19 will be held at its ineffective position by virtue of vacuum in control cylinder 22. If the motorist depresses both brake pedal 12 and clutch pedal 46 for a stop in traffic or on a hill, valve member 53 will be moved by cable 58 from its normal position shown in Fig. 2 to its second position shown in Fig. 3, and the valve will remain in the second position by virtue of engagement by latch lever 71. Air from the atmosphere will thereupon pass into the valve body, thru passage 50 and pipe 32 to vacuum chamber 23. As a result, spring 33 will force pawl 19 into engagement with teeth 14, thereby keeping pedal 12 in a braking position without sustained effort on the part of the driver. The brake will remain effective whether the driver keeps the clutch pedal depressed, or releases the clutch pedal with the gears in neutral or stops the motor.

To resume driving, the motorist will, of course, accelerate the motor and ease the clutch into driving engagement. It is apparent that when the foot throttle is depressed to make the valve latch ineffective, the valve will automatically return to its normal position as the clutch pedal is subsequently released for driving engagement and that the moving parts involved may be adjusted to provide any desired time relation between the release of the brake-latch and the engagement of the clutch. For instance, an adjustment may be had that will provide an automatic smooth transition from brake control to motor control even when the automobile is started on a hill. Thus, while this form of my invention embodies the conception of a brake-latch adapted to release when depression of the throttle concurs with driving engagement of the clutch, a certain latitude is contemplated for proper adjustment.

If the brake pedal alone is depressed during driving, the brake-latch will not be effective. If both the brake pedal and the clutch pedal are depressed, the brake-latch will hold the brake pedal down, but the brake may be released by simply depressing the foot throttle.

If the motor is idle, both the brake-latch associated with the foot brake and the brake-latch associated with the emergency brake will be effective. If the motor is running the latter brake-latch will be ineffective under all conditions. Obviously, there is no difference in the action of either brake-latch between the motor being driven by its own power or by momentum of the car, since in either case the motor intake will induce a vacuum in pipe 32.

Figure 6 indicates a modification of Fig. 1, unchanged parts having corresponding numbers.

A control valve 78 is connected on one side to a pipe 79 that leads to the motor intake (not shown) and on the other side is connected to pipe 32 leading to vacuum control cylinder 22 associated with brake pedal 12, and to a pipe 80 leading to vacuum-control cylinder 41 associated with emergency brake lever 37.

Within valve 78, a passage 81 from pipe 79 branches into passages 82 and 83 communicating respectively with pipes 32 and 80, as shown in Fig. 7. A bore 84 cutting both passages 82 and 83 slidingly houses a valve member 85 and is privided with a relief port 86 between the two passages.

Normally, as shown in Fig. 7, valve member 85 is held towards the right in opposition to the tension of a spring 87 mounted between a pin 88 set in the valve body and a pin 89 extending radially from valve member 85. In this normal position, the left end of the valve member clears passage 82 thereby providing communication between the motor intake and vacuum-control cylinder 22. Simultaneously, the lower side of the valve member cuts off passage 83; while a suitable longitudinal recess 90 on the upper side of the valve member provides communication between pipe 80 and relief port 86.

When valve member 85 is released from its normal position spring 87 moves it to the left to register an annular recess 91 in the valve member with passage 83 thereby providing communication between the motor intake and pipe 80; simultaneously, the left end of the valve member on its lower side cuts off passage 82 and longitudinal recess 90 places pipe 32 in communication with relief port 86.

By virtue of an operative connection such as will now be described, valve 85 is held in the normal position shown in Fig. 7 by the clutch pedal 46, the clutch pedal being in normal driving position.

Extending axially to the right from valve member 85 is a rod 92 having a collar 93 held adjustably thereon by a set screw 94. A bell crank 95 pivoted at 96 has a forked arm 97 straddling rod 92 behind collar 94, to hold the valve member in the normal position. The other arm 98 of the bell crank is connected by a link 99 to clutch pedal 46 above the clutch-pedal pivot 69. Obviously, when the clutch pedal is depressed, bell crank 95 will rotate to permit spring 87 to move valve member 95 to its second position; and when the clutch pedal is subsequently released, the clutch pedal rising will force the valve member back to its normal position.

The operation of this form will be readily understood in the light of previous explanations. Depression of the foot brake pedal alone will not affect the latch associated with the foot pedal; but if the clutch pedal is also depressed, vacuum-control cylinder 22 will be cut off from the motor intake and placed in communication with relief port 86, with the result that the foot-brake latch becomes effective. Upon subsequently releasing the clutch pedal, the latch will be caused to release the brake pedal.

The brake pedal will automatically latch when both the brake pedal and the clutch pedal are depressed for a stop in traffic or on a hill, and to keep the brake applied for the duration of the stop, only the relatively slight exertion required to keep the clutch pedal depressed is necessary.

An advantage of this last form is that when both the brake pedal and clutch are depressed, it is not necessary subsequently to advance the throttle to release the brake pedal.

In this last form, as in the other embodiments of my invention, latitude of adjustment to provide various time-relationships and sequences is contemplated. Thus, the connection between the clutch pedal and the valve may be adjusted to release the brake-latch at any desirable point in the movement of the clutch towards driving engagement.

Since the foot pedal may be latched when the motor is idle, the foot brake may be used for parking. It may not be advisable, however, to depend on the foot brake for a long interval of parking. In the case of a hydraulic brake, leakage may weaken the effectiveness of the brake after a period of time.

It is apparent that the latch associated with the emergency brake in this last form of my invention will be ineffective when the latch associated with the brake pedal is effective and vice versa, while the motor is running. The advantage of this relationship is that, with the gears in neutral, the clutch in engagement, and the engine running, the emergency brake may be latched to hold the car. When the operator resumes driving, he will depress the clutch pedal to change gears and the latch will automatically release the emergency brake.

If the emergency brake is applied for parking with the motor idle, the latch for the emergency brake will also release automatically when the operator on resuming driving depresses the clutch pedal to change gears. I have thus provided for the automatic release of the emergency brake when used for parking either with the motor running or idle. The incorporation of this latch for the emergency brake is, however, not essential.

I have described specific embodiments illustrative of the principles involved in my invention, but these embodiments suggest a wide range of modification and change within the scope of my conception. I reserve the right to all forms that are covered by my appended claims.

Having described my invention, I claim:

1. In a vehicle having a brake-operating member, a clutch-operating member, an accelerator member, and a motor with an intake, the combination therewith of: means to releasably engage said brake-operating member at a brake-applying position; a vacuum-actuated means to release said engaging means; a conduit from the vacuum means to said motor intake; a valve in the conduit operatively connected with said clutch-operating member to cut off communication between the vacuum means and the intake when the clutch-operating member is in clutch-releasing position; a latch means to releasably retain the valve at the cut-off position, said latch means being operatively connected with said accelerator to be released when the accelerator member is advanced; and yielding means to move the latch-means into valve-retaining position.

2. In a vehicle having a brake-operating member, a clutch-operating member, an accelerator member, and a motor with an intake, the combination therewith of: means to releasably engage said brake-operating member at a brake-applying position; yielding means tending to move said engaging means into engagement; a vacuum-actuated means to release said engaging means; a conduit from the vacuum means to said motor intake; a valve in the conduit operatively connected with said clutch-operating member to cut off communication between the vacuum means and the intake when the clutch-operating member is in clutch-releasing position; yielding means tending to move said valve to its open position; a latch means to releasably retain the valve at the cut-off position said latch means being operatively connected with said accelerator member to be released when the accelerator member is advanced; and yielding means tending to hold said latch means in valve-retaining position.

3. In a vehicle having two independent brake-operating members, a clutch-operating member, and a motor with an intake, the combination therewith of: a latch to releasably hold one of said brake operating members in a brake applying position, means for holding said latch out of holding position when the subatmospheric pressure in said motor intake reaches a predetermined value; a second latch to releasably hold the other of said brake-operating members at a brake-applying position, and means for holding said second latch out of engaged position when the subatmospheric pressure in the motor intake reaches a predetermined value provided the clutch operating member is in clutch disengaging position.

4. In a vehicle having two independent brake-operating members, an accelerator member, a clutch-operating member, and a motor with an intake, the combination therewith of: a latch to releasably hold one of said brake-operating members in a brake-applying position; means for holding said latch out of holding position when the subatmospheric pressure in said motor intake reaches a predetermined value; a second latch to releasably hold the other of said brake-operating members in a brake-applying position, means for holding said second latch out of holding position when the subatmospheric pressure in said motor intake reaches a predetermined value; means by which said holding means is controlled by the clutch-operating member, and by the accelerator member whereby the latch engages the corresponding brake-operating member when the clutch-operating member is in clutch-disengaging position while the motor is turning over so as to create a predetermined value of subatmospheric pressure in the motor intake, and whereby the latch releases the brake-operating member when the motor is subsequently accelerated with the clutch-operating member in clutch-engaging position.

5. In a vehicle having two independent brake-operating members, a clutch-operating member, and a motor with an intake, the combination therewith of: means movable to releasably engage one of said brake-operating members at a brake-applying position; a second means movable to releasably engage the other of said brake-operating members at a brake-applying position; means for holding the first engaging means out of engaging position when the subatmospheric pressure in said motor intake reaches a predetermined value; means for holding said second engaging means out of engaging position when the subatmospheric pressure in said motor intake reaches a predetermined value; and means responsive to the clutch-operating member to make one of said holding means inoperative to hold its corresponding engaging means out of engagement with the corresponding brake-operating member when the clutch-operating member is in clutch-releasing position.

EVERETT C. MORPHET.